US008973529B1

(12) United States Patent
Tsengas

(10) Patent No.: US 8,973,529 B1
(45) Date of Patent: Mar. 10, 2015

(54) COVERED BOWLS SUCH AS PET FOOD AND WATER BOWLS

(71) Applicant: Steven Tsengas, Fairport Harbor, OH (US)

(72) Inventor: Steven Tsengas, Fairport Harbor, OH (US)

(73) Assignee: Our Pet's Company, Fairport Harbor, OH (US)

( * ) Notice: Subject to any disclaimer, the term of this patent is extended or adjusted under 35 U.S.C. 154(b) by 0 days.

(21) Appl. No.: 13/651,612

(22) Filed: Oct. 15, 2012

(51) Int. Cl.
*A01K 5/00* (2006.01)

(52) U.S. Cl.
USPC ........................................ 119/61.56

(58) Field of Classification Search
USPC .................. 119/61.56, 61.54, 61.5
See application file for complete search history.

(56) References Cited

U.S. PATENT DOCUMENTS

| | | | | | |
|---|---|---|---|---|---|
| 1,959,262 | A | * | 5/1934 | Colabrese | 220/632 |
| 1,985,558 | A | * | 12/1934 | Alexander | 220/632 |
| 2,731,056 | A | * | 1/1956 | Anson | 16/86 A |
| 4,798,173 | A | * | 1/1989 | Wilgren | 119/61.52 |
| 4,803,954 | A | * | 2/1989 | Welch et al. | 119/61.53 |
| 5,158,193 | A | * | 10/1992 | Chen | 215/386 |
| 5,413,302 | A | * | 5/1995 | Ferster | 248/346.11 |
| 5,467,733 | A | * | 11/1995 | Messina | 119/464 |
| 5,485,937 | A | * | 1/1996 | Tseng | 220/571 |
| 5,579,946 | A | * | 12/1996 | Rowan et al. | 220/592.27 |
| 5,842,675 | A | * | 12/1998 | Davitt | 248/346.5 |
| 5,979,361 | A | * | 11/1999 | Willinger | 119/61.54 |
| 5,992,671 | A | * | 11/1999 | Wardani | 220/293 |
| D423,733 | S | * | 4/2000 | Choi et al. | D30/129 |
| 6,145,474 | A | * | 11/2000 | Lemkin | 119/61.5 |
| 6,431,389 | B1 | * | 8/2002 | Jerstroem et al. | 220/574.3 |
| 6,516,747 | B1 | * | 2/2003 | Willinger | 119/61.54 |
| 6,578,809 | B1 | * | 6/2003 | Dimella | 248/346.11 |
| RE39,391 | E | * | 11/2006 | Jerstroem et al. | 220/574.3 |
| D565,253 | S | * | 3/2008 | Modi et al. | D30/129 |
| D613,125 | S | * | 4/2010 | Sierra et al. | D7/584 |
| D613,556 | S | * | 4/2010 | Sierra et al. | D7/584 |
| D636,944 | S | * | 4/2011 | Anderson et al. | D30/129 |
| 8,286,589 | B1 | * | 10/2012 | Tsengas | 119/61.56 |

* cited by examiner

*Primary Examiner* — Yvonne Abbott
(74) *Attorney, Agent, or Firm* — John D. Gugliotta

(57) ABSTRACT

A cover for a bowl, such as a pet food or water bowl, that comprises a cover molded on or affixed to the outer surface of a bowl, thereby providing aesthetically pleasing exterior features, while also providing protection to the covered bowl and insulating qualities to the contents of the covered bowl. The cover of the present invention may be fabricated from rubber or plastic secured to the outer surface of the metallic bowl.

16 Claims, 5 Drawing Sheets

COVERED BOWLS SUCH AS PET FOOD AND WATER BOWLS

RELATED APPLICATIONS

The present application is a Continuation-in-Part U.S. Pat. No. 8,286,589 filed on Oct. 18, 2010, which was a Continuation-in-Part of U.S. Non-Provisional patent application Ser. No. 12/049,962, which was a Continuation-in-Part of U.S. Non-Provisional patent application Ser. No. 11/067,046, filed on Feb. 28, 2005, which is a Continuation-in-part of U.S. Ser. No. 10/616,282, filed on Jul. 10, 2003: which was a Continuation-in-Part of U.S. Ser. No. 09/813.746, filed on Mar. 21, 2001, which was a conversion of U.S. Provisional Application Ser. No. 60/193,963, filed on Mar. 31, 2000, wherein the present application claims a benefit of the priority filing date of Mar. 31, 2000.

BACKGROUND OF THE INVENTION

1. Field of the Invention

The present invention relates generally to new and novel improvements in pet food and water bowls. More particularly, the present invention relates to a covered pet food and/or water bowl, such as a stainless steel pet feeder having a cover for the lower surface that is preferably durable and lightweight, and provides an aesthetically pleasing appearance, protection to both the bowl and the surface on which the bowl may be set upon, and possibly partially insulate the contents placed therein.

2. Description of the Related Art

Pet food and water bowls of many types have existed commercially for quite some time. The use of stainless steel in the manufacturing of such bowls as become popular due to their durability, ease of cleaning and relative value, with the price of such bowls having been reduced greatly over the years with increasing supply. However, given the relative hardness of stainless steel pet feeders made from this material have a tendency to move or slide about on smooth flooring surfaces. Such movement can cause distraction or frustration to the pet while feeding, and can additionally cause noise on or scratching of smooth surface floors.

While rubber or elastomeric covers have been made that removably affix to the lower surface of some bowl designs, while providing an aesthetically pleasing appearance, such removable covers create an impediment when it comes to cleaning of such bowls, with consumers rejecting such designs due to their inability to be machine washable as well as becoming a weak nondurable element of such a combination.

Consequently, a need has been felt for a stainless steel feeders with nonskid rubber bottoms permanently affixed thereto in order to prevent slipping, skidding and noise, while at the same time allowing for the entire assembly to be durable and machine washable

SUMMARY OF THE INVENTION

It is therefore an object of the present invention to provide an improved pet bowl having a covered lower surface.

It is another object of the present invention to provide a pet bowl incorporating a covered lower surface that minimizes and substantially precludes the bowl from slipping and sliding along or across a surface, such as a floor, upon which it is placed.

It is a further feature of the present invention to provide a pet food or drinking bowl that includes a covered lower surface that can provide some level of insulation for the contents of the bowl placed therein.

Briefly described according to the preferred embodiment of the present invention, the aforementioned objects of the present invention are attained by a metallic pet feeding bowl having a nonmetallic cover secured on the lower exterior surface of a pet food or drink bowl. The pet bowl may be formed of stainless steel, and the nonmetallic cover may be formed of an elastomeric or rubber material that is secured to the lower outer surface by bonding, vulcanizing, dip molding, adhesive attachment or the like. The cover may also be manufactured by various other known means for shaping plastic or rubber type materials. The cover may provide a pleasing aesthetic appearance, as well as providing protection to the bowl's bottom or the surface on which the bowl may be placed. The cover can be formed directly in contact with the bowl's lower surface, or can be pre-fabricated to a shape substantially formed to the shape of the bowl to fit over the outer lower surface of the bowl prior to it being affixed or adhered thereto. In the preferred embodiment the cover has an annular shape such as to adhere to and cover only the lower peripheral outer circumference of the bowl's bottom surface; however in an alternate embodiment the cover has a disc-like shape to cover the entire lower outer surface of the bowl. The material selection, position, shape and overall fabrication and attachment of the lower cover is intended to provide frictional resistance to substantially prevent the bowl from slipping, sliding or otherwise moving during use by the pet, and further preventing scratching, scarring and annoying noises that may result from sliding on a floor. Finally, if formed of sufficient thickness the cover may provide a certain degree of insulation to the contents placed within the bowl.

Other advantages and novel features of the present invention will become apparent in the following detailed description of the invention when considered in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
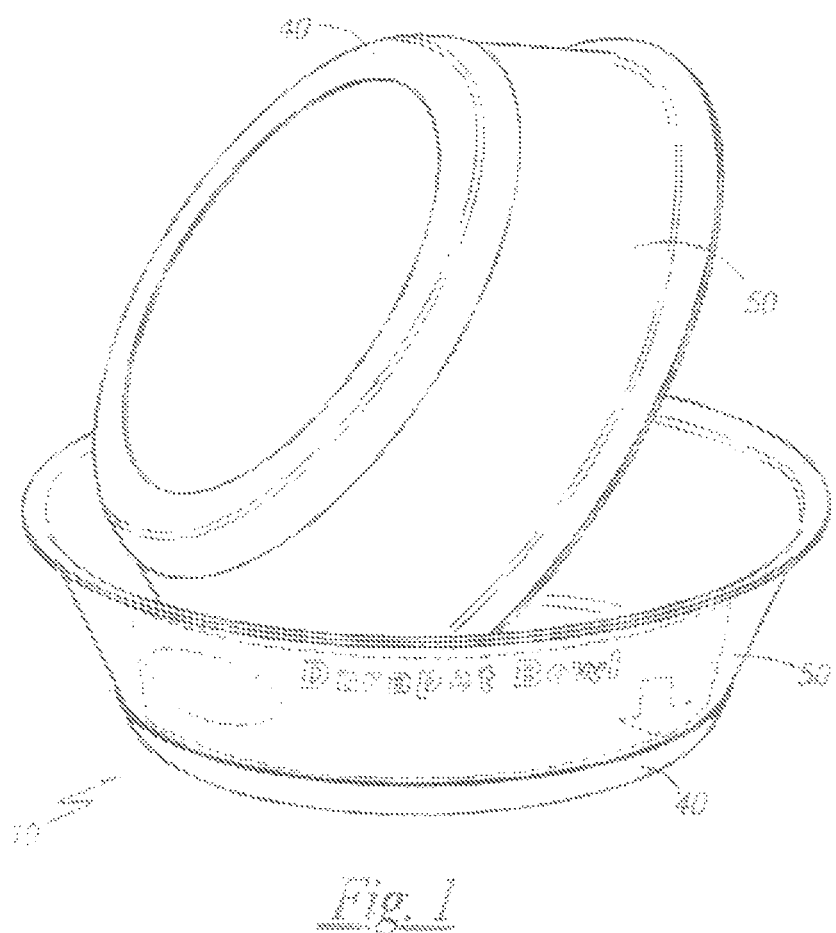
FIG. 1 is a front perspective view and a bottom perspective view in combination of a pair of animal feeders or drinking containers having a cover for the lower surface according to the preferred embodiment of the present invention.
Figure 2:
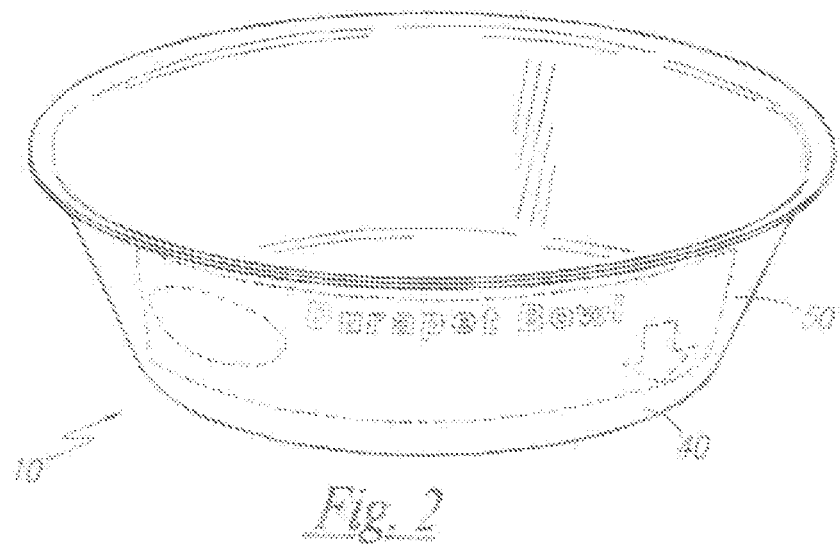
FIG. 2 is a front, fop perspective view thereof.
Figure 3:
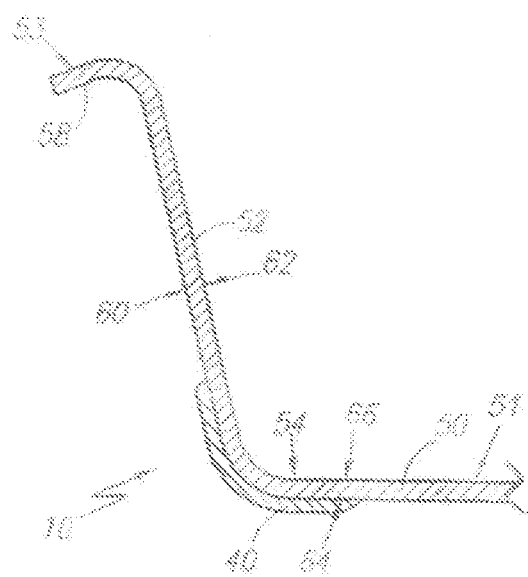
FIG. 3 is a partial cross sectional view thereof taken along a sidewall.
Figure 4:
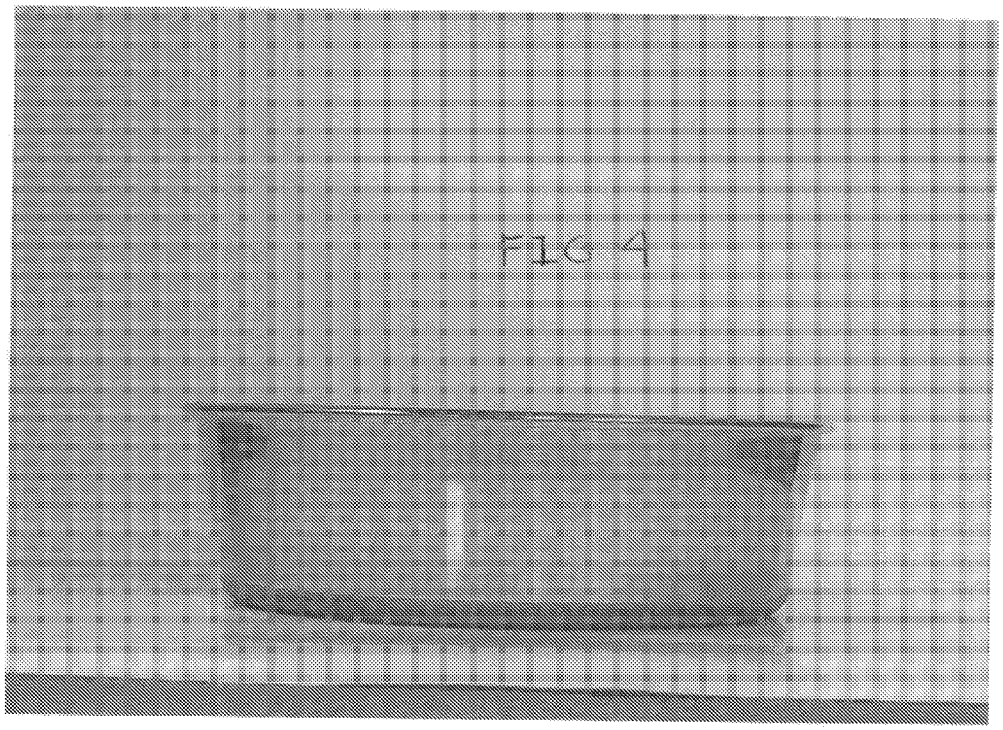
FIG. 4 is a photograph of a side elevation view of an animal feeder or drinking container having a cover for the lower surface that embodies the preferred embodiment of the present invention.
Figure 5:
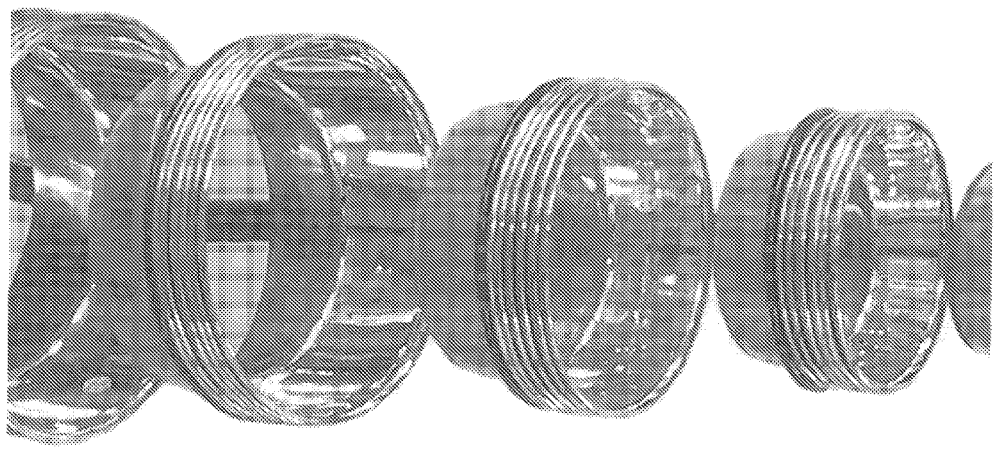
FIG. 5 is a photograph showing a top perspective views of the animal feeders or drinking containers of FIG. 4 shown in a variety of sizes.
Figure 7:
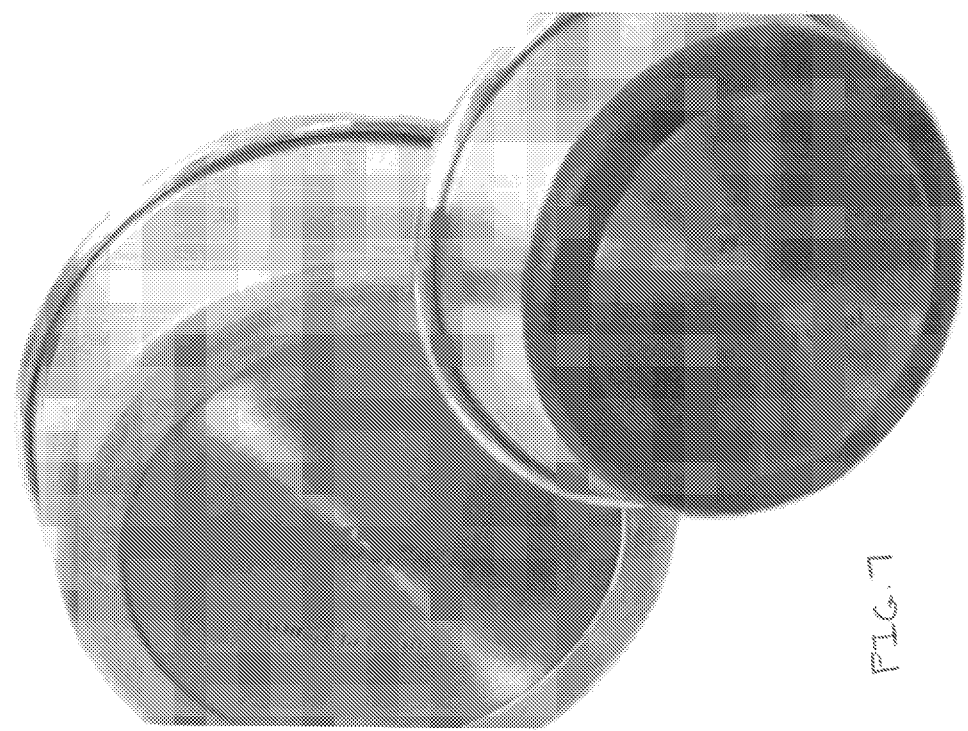
FIG. 7 is a photograph showing bottom perspective views of feeders or containers of FIG. 4.
Figure 6:
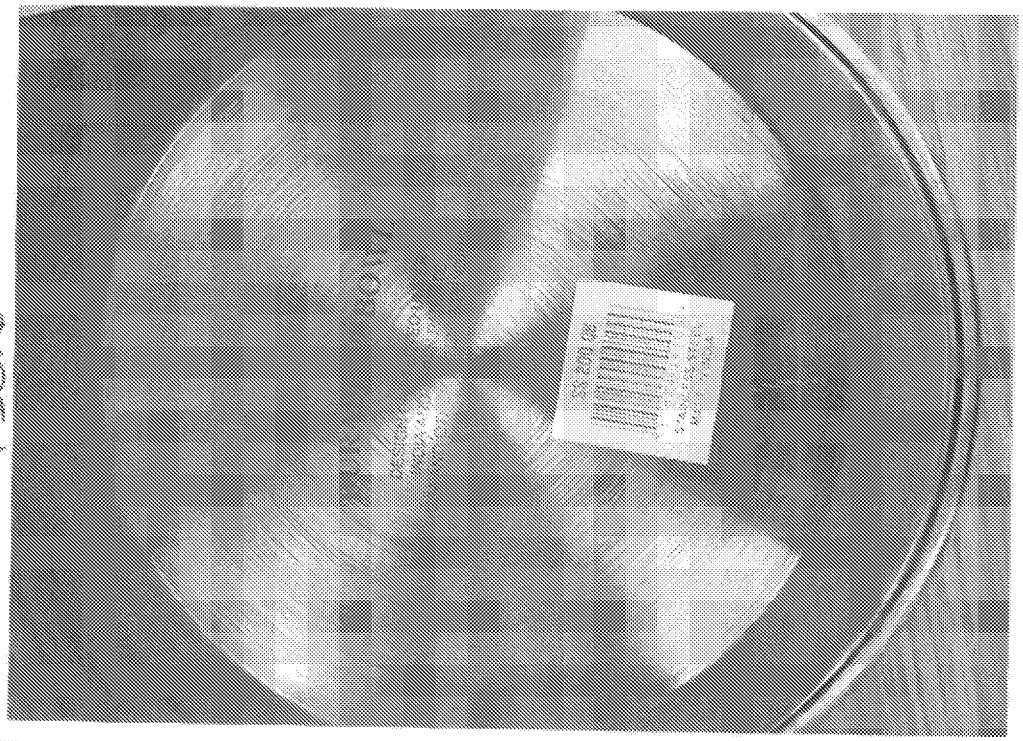
FIG. 6 is a detail photograph of a bottom plan view of the feeder or container of FIG. 4.
Figure 8:
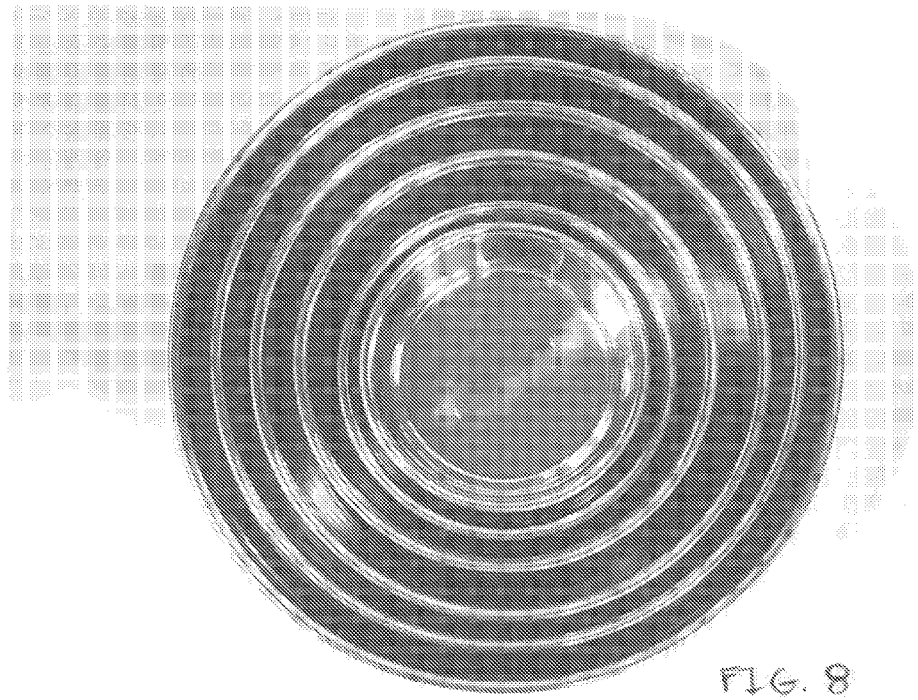
FIG. 8 is a photograph showing a top plan views of the animal feeders or drinking containers of FIG. 4 shown in a variety of sizes shown nested.
Figure 9:
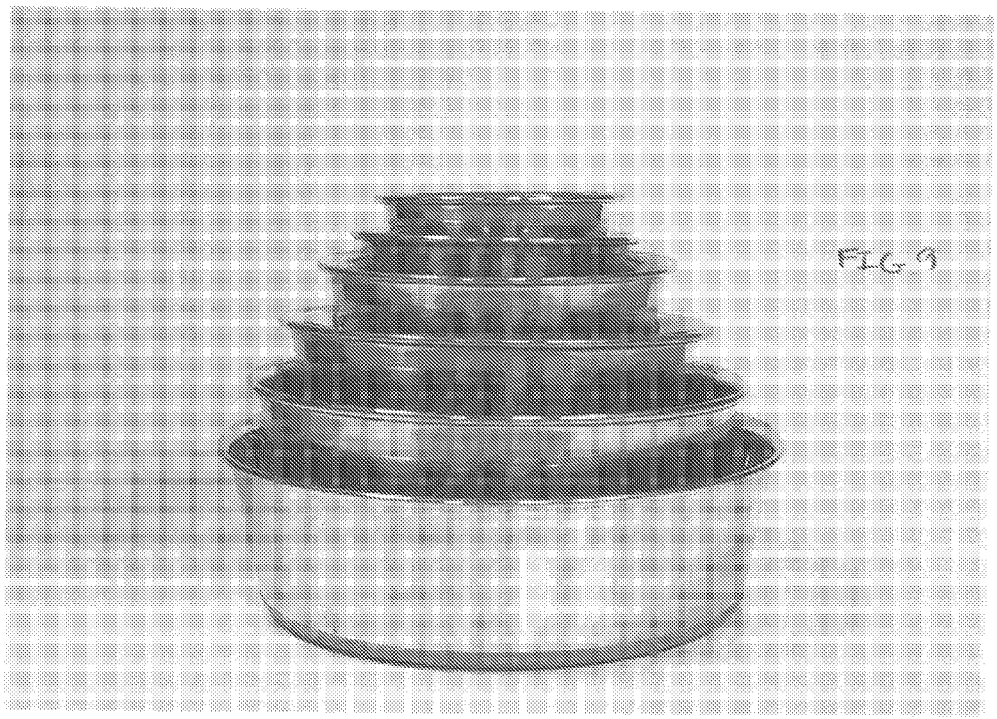
FIG. 9 is a photograph showing a side elevational view of the animal feeders or drinking containers of FIG. 8 shown in a variety of sizes shown nested.

The best mode for carrying out the invention is presented in terms of its preferred embodiment, herein depicted within FIGS. 1 through 9.

1. Detailed Description of the Figures

Referring now to FIG. 1 through FIG. 9, a pet food or drinking bowl 10 is shown in accordance with a preferred embodiment of the present invention. It Is envisioned that the bowl 10 may be formed in a manner similar to otherwise conventional metallic (i.e. stainless steel) pet food or water bowl with the additional innovative feature of having an outer cover 40 affixed to the exterior lower surface 50 of the bowl 10. It is anticipated that, and it is a key feature of the present invention to utilize a metallic pet feeding bowl 10 in conjunction with a nonmetallic cover 40 secured on the lower exterior surface 50 of a pet food or drink bowl. The pet bowl 10 may be formed of stainless steel, and the nonmetallic cover 40 may be formed of an elastomeric or rubber material that is secured to the lower outer surface 50.

The cover 40 may be affixed to the exterior lower surface 50 by a variety of methods, including, but not limited to, dip molding or manual manipulation or adhesive attachment of a separately provided cover 40 onto the outer lower periphery of the bowl 50. The cover may also be manufactured by various other known means for shaping plastic or rubber type materials.

The cover 40 may provide a pleasing aesthetic appearance, as well as providing protection to the bowl's bottom 50 or the surface on which the bowl may be placed (not shown). The cover 40 can be formed directly in contact with the bowl's lower surface 50, or can be pre-fabricated to a shape substantially formed to the shape of the bowl to fit over the outer lower surface of the bowl prior to it being affixed or adhered thereto.

The bowl 50 may be of various designs, such as the one depicted in FIGS. 3-9, comprising an annular ring 52 such as to adhere to and cover only the lower peripheral outer circumference of the bowl's bottom surface depending from a bottom surface 54, wherein the sidewall 52 terminates at an upper peripheral rim 53 opposite the bottom surface 54 that is coextensive with a bowl opening 56. The sidewall 52 and bottom surface 54 each have an exterior surface, wherein the exterior and interior surfaces of the sidewall 52 are denoted as 60 and 62, respectively, and the exterior and interior surfaces of bottom surface 54 are denoted as 64 and 66, respectively. In this preferred embodiment the cover has an annular shape such as to adhere to an cover only the lower peripheral outer circumference of the bowl's bottom surface; however, in an alternate embodiment it is anticipated as an obvious extension for the cover to have a disc-like shape to cover the entire lower outer surface of the bowl.

The material selection, position, shape and overall fabrication and attachment of the lower cover is intended to provide fractional resistance to substantially prevent the bowl from slipping, sliding or otherwise moving during use by the pet, and further preventing scratching, scarring and annoying noises that may result from sliding on a floor. Finally, if formed of sufficient thickness the cover may provide a certain degree of insulation to the contents placed within the bowl.

As should be obvious to a person having ordinary skill in the relevant art, in light of the present teachings, various alternate embodiments and/or design choices may be made for both the bowl 10 and the cover 40, as well as the attachment there between. The lower cover 40 can be shaped such as to adhere only to the lower peripheral outer circumference of the bowl's bottom surface, but may be provided having various heights, widths and thicknesses, as well as being available with various functional or aesthetic contours. It should be noted that FIG. X through FIG. xx illustrate a cover 40 that traverses only a minimal amount of the height of sidewall 52 of bowl 50, but traversal of entire height of the sidewall 52 may also be provided. While such a configuration would not provide any additional functionality in preventing slipping between the lower outer surface 50 of the bowl and the supporting surface (such as, for example, a floor) such configurations are anticipated as providing additional insulative or aesthetic functionality.

2. Operation of the Preferred Embodiment

To use the present invention, in accordance with a preferred embodiment of the present invention, a cover 40 is placed upon a bowl 50 to provide protection to the bowl 50, reduce slipping and sliding of the bowl 50 during use by a pet, and to possibly provide insulating properties to the contents of the bowl 50. The cover 40 may be fabricated onto the bowl 50 during manufacture of the cover, or may be affixed thereto as a secondary operation after being prefabricated.

When a pet eats or drinks from the bowl 50, the cover 40 resists movement by the glutinous properties of the cover 40 adhering and fractionally impinging the cover 40 to a lower supporting surface.

The foregoing descriptions of specific embodiments of the present invention have been presented for purposes of illustration and description and are not intended to be exhaustive or to limit the invention to the precise forms disclosed. Obviously many modifications and variations are possible in light of the above teaching. The embodiments were chosen and described in order to best explain the principles of the invention and its practical application, and enable others skilled in the art to best utilize the invention and various embodiments. It is intended that the scope of the invention be defined by the Claims appended hereto and their equivalents. Therefore, the scope of the invention is to be limited only by the following claims.

What is claimed is:

1. An animal feeder or drinking container substantially comprising:
    a bowl formed of metal, said bowl having an exterior lower outer surface circumscribed by an outwardly angular upwardly directed first sidewall forming a generally concave containment volume for animal food or drink;
    a cover secured to at least a portion or the exterior lower outer surface of said bowl in a manner such that said cover remains affixed to said bowl during lifting, moving or repositioning, wherein said cover further comprises an annular second sidewall extending from said exterior lower outer surface;
    wherein the second sidewall terminates at an upper portion opposite the bottom surface that is coextensive with and circumscribes an outer surface of said bowl.

2. The animal feeder of claim 1, wherein said cover is formed having a decorative color.

3. A process for making an animal feeder of claim 1 comprising:
    a. Forming a pliable polymeric or rubber material selectively to the shape of at least part of an outer surface of said animal feeder bowl;

b. Adapting a selective portion of said animal feeder bowl to facilitate securing said pliable polymeric or rubber material to said bowl; and c. Securing said pliable polymeric or rubber material selectively to said selective portion of said animal feeder bowl.

4. The process of claim 3, wherein said animal feed bowl is formed of stainless steel or other metal.

5. The process of claim 3, wherein said process of securing said pliable polymeric or rubber material to said animal feeder bowl comprises placing an adhesive between said pliable polymeric or rubber material and said animal feeder bowl.

6. The process of claim 3, wherein said selective portion of said animal feeder bowl cover comprises an annular sidewall extending from a bottom surface, wherein the sidewall terminates at an upper portion opposite the bottom surface that is coextensive with and a circumscribes said bottom surface of said bowl.

7. The process of claim 3, wherein said selective portion of said animal feeder bowl cover comprises the entire bottom bowl surface and the annular sidewall extending up from said bottom surface.

8. The process of claim 3, wherein said pliable polymeric or rubber material is formed having a decorative color.

9. The process of claim 3, wherein securing said pliable polymeric or rubber material selectively to said selective portion of said animal feeder bowl is accomplished through fictional forces between the outer circumference of said bowl and the inner surface of said pliable polymeric or rubber material.

10. The process of claim 3, wherein securing said pliable polymeric or rubber material selectively to said selective portion of said animal feeder bowl is accomplish through adhering the inner surface of said pliable polymeric or rubber to the outer circumference of said bowl.

11. The process of claim 3, wherein securing said pliable polymeric or rubber material selectively to said selective portion of said animal feeder bowl is accomplished through vulcanizing the inner surface of said pliable polymeric or rubber directly to the outer circumference of said bowl.

12. A process for making an animal feeder of claim 1 comprising:

a. Forming a metal bowl having an exterior lower outer surface circumscribed by an upwardly directed sidewall and forming a generally concave container volume adapted for functioning as a small animal feeder or drinking container;

b. Adapting a selective portion of said exterior lower outer surface to facilitate securing said pliable polymeric or rubber material to said bowl;

c. Forming a pliable polymeric or rubber material selectively to the shape of at least pan of said exterior lower outer surface;

d. Securing said pliable polymeric or rubber material selectively to a selective portion of said exterior lower.

13. The process of claim 12, wherein said animal feed bowl is formed of stainless steel or other metal.

14. The process of claim 12, wherein said process or securing said pliable polymeric or rubber material selectively to a selective portion of said exterior lower comprises placing an adhesive between said pliable polymeric or rubber material and said animal feeder bowl.

15. The process of claim 12, wherein securing said pliable polymeric or rubber material selectively to said selective portion of said animal feeder bowl is accomplished through vulcanizing the inner surface of said pliable polymeric or rubber directly to the outer circumference of said bowl.

16. The animal feeder of claim 1, wherein said cover is formed of a pliable polymeric or rubber material.

* * * * *